(12) United States Patent
Ganglmayr

(10) Patent No.: US 10,054,041 B2
(45) Date of Patent: Aug. 21, 2018

(54) CONNECTING ROD FOR AN INTERNAL COMBUSTION ENGINE

(71) Applicant: IMT-C Innovative Motorfahrzeuge und Technologie—Cooperation GmbH, Krenglbach (AT)

(72) Inventor: Josef Ganglmayr, Krenglbach (AT)

(73) Assignee: IMT-C Innovative Motorfahrzeuge und Technologie—Cooperation GmbH, Krenglbach (AT)

(*) Notice: Subject to any disclaimer, the term of this patent is extended or adjusted under 35 U.S.C. 154(b) by 8 days.

(21) Appl. No.: 15/304,152

(22) PCT Filed: May 7, 2015

(86) PCT No.: PCT/AT2015/050114
§ 371 (c)(1),
(2) Date: Oct. 14, 2016

(87) PCT Pub. No.: WO2015/172168
PCT Pub. Date: Nov. 19, 2015

(65) Prior Publication Data
US 2017/0037778 A1    Feb. 9, 2017

(30) Foreign Application Priority Data

May 12, 2014 (AT) .............. A 50330/2014

(51) Int. Cl.
*F02B 75/04* (2006.01)
*F16C 7/06* (2006.01)
(Continued)

(52) U.S. Cl.
CPC .............. *F02B 75/045* (2013.01); *F16C 7/06* (2013.01); *F16C 23/10* (2013.01); *F16H 19/04* (2013.01); *F16C 2360/22* (2013.01)

(58) Field of Classification Search
CPC .......... F02B 75/045; F16C 7/06; F16H 19/04
See application file for complete search history.

(56) References Cited

U.S. PATENT DOCUMENTS

2008/0022977 A1* 1/2008 Marchisseau ......... F02B 75/045
                                                                    123/48 A

FOREIGN PATENT DOCUMENTS

DE      198 41 381 A1    5/1999
DE  10 2005 055 199 A1   5/2007
(Continued)

OTHER PUBLICATIONS

International Search Report of PCT/AT2015/050114, dated Oct. 8, 2015.

Primary Examiner — Jacob Amick
Assistant Examiner — Charles Brauch
(74) Attorney, Agent, or Firm — Collard & Roe, P.C.

(57) ABSTRACT

A connecting rod is described for an internal combustion engine comprising a shaft (1) and two connecting rod eyes (2, 3), of which the connecting rod eye (3) accommodating a piston pin has an eccentric (4) forming a pin bearing (5), and comprising a positioning drive (20), which is drivable via a hydraulic positioning cylinder (16), for a gear ring (8) of the eccentric (4). To provide advantageous design conditions, it is proposed that the eccentric (4) be mounted so it is rotationally-adjustable between two stop-limited operating positions, which are offset by at least approximately 180° from one another, in which the axis (7) of the pin bearing (5) is located at least approximately in a shared axial plane (19) of the two connecting rod eyes (2, 3), and the positioning drive (20) comprise a gearwheel (9) meshing with the gear ring (8) of the eccentric (4).

5 Claims, 1 Drawing Sheet

(51) Int. Cl.
    *F16H 19/04*    (2006.01)
    *F16C 23/10*    (2006.01)

(56)        References Cited

FOREIGN PATENT DOCUMENTS

DE    10 2012 002 832 A1      8/2013
EP             1 424 486 A1   6/2004
EP              1424486 A1 *  6/2004   ............ F02B 75/045
JP            S 59-40537 U    3/1984
JP            S 59-40538 U    3/1984
JP              06212993 A *  8/1994   ................ F16C 7/06
JP            H 06-212993 A   8/1994
JP            2000-038937 A   2/2000

* cited by examiner

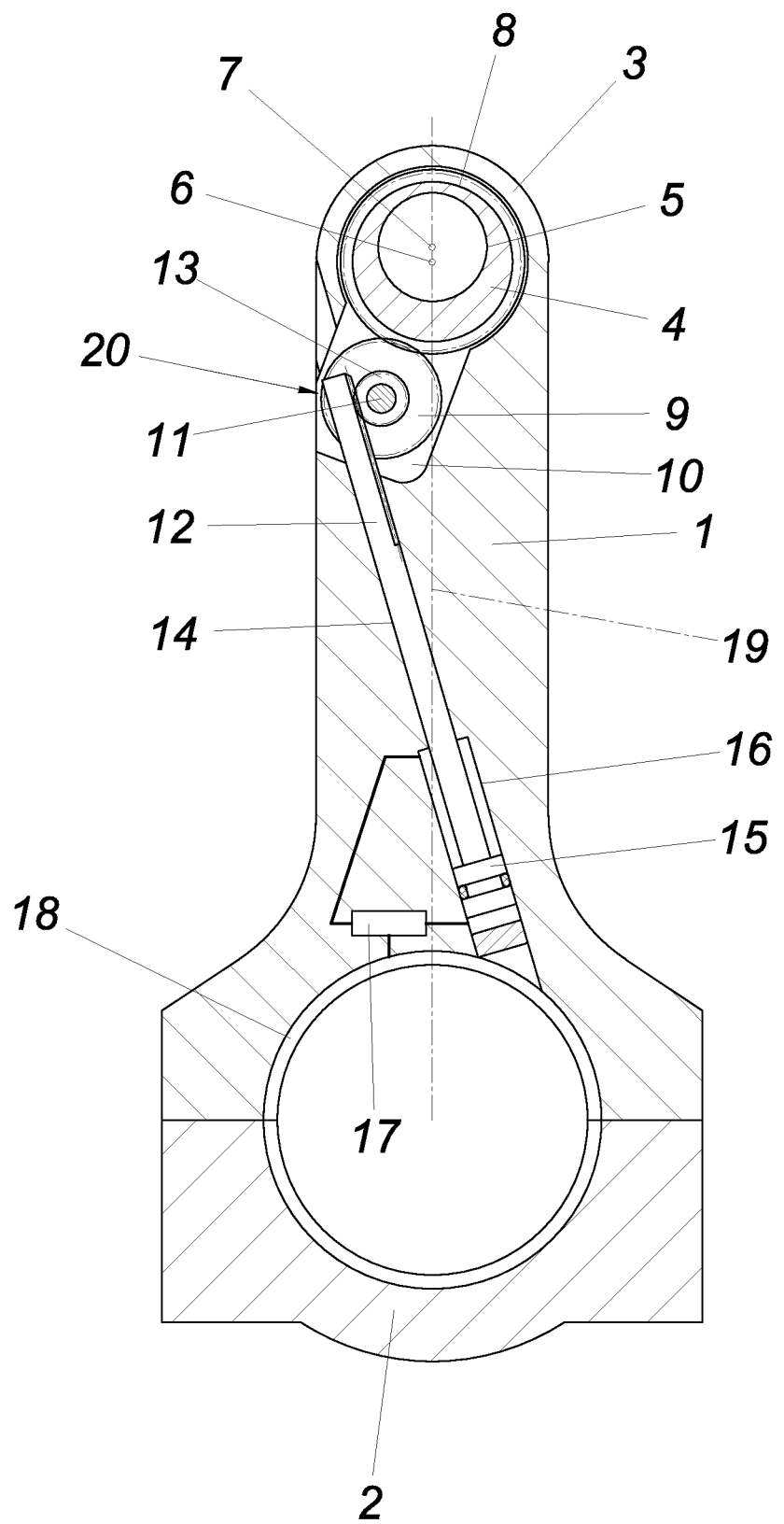

CONNECTING ROD FOR AN INTERNAL COMBUSTION ENGINE

CROSS REFERENCE TO RELATED APPLICATIONS

This application is the National Stage of PCT/AT2015/050114 filed on May 7, 2015, which claims priority under 35 U.S.C. § 119 of Austrian Application No. A50330/2014 filed on May 12, 2014, the disclosures of which are incorporated by reference. The international application under PCT article 21(2) was not published in English.

1. FIELD OF THE INVENTION

The invention relates to a connecting rod for an internal combustion engine, comprising a shaft and two connecting rod eyes, of which the connecting rod eye accommodating a piston pin has an eccentric forming a pin bearing, and having a positioning drive, which is drivable via a hydraulic positioning cylinder, for a gear ring of the eccentric.

2. DESCRIPTION OF THE PRIOR ART

To change the compression ratio in internal combustion engines, inter alia, adjusting the effective length of the connecting rod, which connects the piston to the crankshaft, via an eccentric which forms the pin bearing for the piston pin, is known. To enable a transition between various compression ratios to be set, it has already been proposed (DE 10 2005 055 199 A1) that the eccentric be connected on opposing sides to two crank arms, on which pushrods linked to positioning pistons engage. The respective positioning cylinder, to which hydraulic pressure can be applied via a check valve, can alternately be connected to a return line via a switchover valve, so that in the event of a pressure load of the connecting rod, the piston of the positioning cylinder connected to the return line displaces hydraulic fluid from the cylinder chamber, while hydraulic fluid is suctioned into the cylinder chamber via the piston of the other positioning cylinder, with the consequence that the eccentric is rotated. By switching over the switchover valve, a rotational adjustment of the eccentric in the opposite direction can be initiated, wherein upon blocking of the return flow of both positioning cylinders, the respective rotational position of the eccentric is hydraulically fixed. This known design has the disadvantage that as a result of the adjustment mechanism via two opposing pushrods, the possible rotational angle for the eccentric is limited, and the forces acting on the connecting rod stress the adjustment mechanism, and also do so if the attempt is made by damping the positioning movement of the eccentric to reduce the stresses during the eccentric adjustment.

In addition, (JP S5940537 U), designing the positioning drive for the eccentric, which forms a pin bearing of the connecting rod, as a hydraulic positioning cylinder, which engages on a gear ring of the eccentric, is known. Since the circumferential length of the gear ring only permits a limited rotational adjustment of the eccentric, corresponding stresses of the positioning drive in operating positions of the eccentric have to be expected.

SUMMARY OF THE INVENTION

The invention is therefore based on the object of embodying a connecting rod for an internal combustion engine so that upon use of an eccentric to set the compression ratio of the internal combustion engine via a change of the effective connecting rod length, a stress of the positioning drive via the eccentric in the respective selected compression position can be precluded.

Proceeding from a connecting rod of the type described at the outset, the invention achieves the stated object in that the eccentric is mounted so it is rotationally adjustable between two stop-limited operating positions, which are offset by at least approximately 180° in relation to one another, and in which the axis of the pin bearing is located at least approximately in a shared axial plane of the two connecting rod eyes, and the positioning drive comprises a gearwheel meshing with a gear ring of the eccentric.

It is ensured by the rotational adjustment of the eccentric between two operating positions, which are angularly offset by 180° from one another, and in which the axes of the pin bearing are located in a shared axial plane of the two connecting rod eyes, that connecting rod loads caused by the internal combustion engine can exert no or, in the case of a connecting rod inclined position, only a minor torque on the eccentric, so that the positioning drive for the eccentric remains nearly stress-free in its operating positions. This applies not only to the geometrical dead center positions of the eccentric, in which the axis of the pin bearing is located in the shared axial plane of the two connecting rod eyes, but rather also in a vicinity of these dead center positions. As a result of the operating positions of the eccentric, which are predefined in the dead center region by a stop, no separate holding forces are required for locking these operating positions, which is accompanied by simple design conditions, in particular if a stop-limited top dead center position is provided for the two operating positions.

Because of the rotational adjustment by at least approximately 180°, in comparison to a limited rotational adjustment of the eccentric with a uniform rate of change of the compression ratio, eccentrics having a lesser eccentricity can be used and therefore smaller structural sizes can be ensured.

However, operating positions in the region of the two dead center positions of the eccentric require corresponding positioning drives for the eccentric. By providing a gearwheel which meshes with a gear ring for the eccentric, structurally simple positioning drives, which are drivable via a hydraulic positioning cylinder, can be used, which can be housed in a space-saving manner in the connecting rod shaft. To convert the linear positioning movement of a hydraulic positioning cylinder into a rotational movement required for the eccentric adjustment, a toothed rack which meshes with a gearwheel can advantageously be provided. The positioning travel of the toothed rack which is required for a rotational adjustment by 180° is dependent on the diameter of the gearwheel meshing with the toothed rack. For this reason, it is advisable to drive the gearwheel meshing with the toothed rack via a shaft, on which the gearwheel driven by the toothed rack is seated, so that an appropriate transmission ratio can be used for the eccentric adjustment.

However, the positioning drive driven by the hydraulic positioning cylinder can also comprise a main shaft driven by a toothed rack, via which the eccentric drive is then derived, for example, via a worm gear. It is solely important that the positioning drive converts the linear piston movement of the hydraulic positioning cylinder into a rotational movement, for which a push rod gearing can also be used under certain circumstances. In general, however, the requirement exists that the positioning drive cannot change the dimensions of the connecting rod to an extent which endangers its routine installation.

Particularly advantageous design conditions result if the hydraulic positioning cylinder comprises a piston to which pressure can be applied on both sides, because in this case the rotational adjustment of the eccentric can be performed in both directions by a corresponding pressure application to the positioning cylinder via a corresponding switchover valve, via which the two operating positions of the eccentric are also easily hydraulically lockable. However, a positioning cylinder can also be used to which hydraulic pressure fluid is applied on one side against the force of a restoring spring, so that the one operating position is fixed via the restoring spring.

BRIEF DESCRIPTION OF THE DRAWING

The subject matter of the invention is illustrated by way of example in the drawing, and specifically a connecting rod according to the invention is shown in a schematic section.

DESCRIPTION OF THE PREFERRED EMBODIMENT

The schematically shown connecting rod for an internal combustion engine comprises, in a conventional manner, a shaft 1 having a connecting rod eye 2 for a crank pin of the crankshaft and having a connecting rod eye 3 for a piston pin. To set the effective connecting rod length, an eccentric 4, which forms an eccentric pin bearing 5, is mounted in the connecting rod eye 3 for the piston pin so it is rotatable coaxially in relation to the connecting rod eye 3. The axis of the connecting rod eye 3 or the axis of rotation of the eccentric 4 is designated with 6. The axis of the pin bearing 5 is indicated under the reference sign 7.

For the rotational adjustment of the eccentric 4, it is provided with a gear ring 8, which meshes with a gearwheel 9. The gearwheel 9 is mounted in a connecting rod pocket 10 on a shaft 11, on which a gearwheel 13, which meshes with a toothed rack 12, is mounted in a rotationally-fixed manner. The toothed rack 12, which is guided in a guide 14 of the connecting rod shaft 1, is connected to the piston 15 of a hydraulic positioning cylinder 16, to which a hydraulic pressure fluid can be applied via a switchover valve 17. The switchover valve 17, which can be supplied with hydraulic pressure fluid via a circumferential groove 18 of the connecting rod eye 2 for the crank pin, alternately applies pressure to one of the two piston sides of the positioning cylinder 16 depending on the selected switch position. The control of the switchover valve 17 can be performed in a conventional manner via a hydraulic control line (not shown for reasons of comprehensibility), which switches over the switchover valve 17, for example, against the force of a restoring spring, so that depending on the control of the switchover valve 17, the toothed rack 12 is displaced in one or the other direction.

The eccentric 4 is mounted so it is rotationally adjustable in a stop-limited manner between two operating positions, which are angularly offset from one another by 180°. These operating positions are distinguished in that the axis 7 of the pin bearing 5 is located in them in each case in the shared axial plane 19 of the two connecting rod eyes 2 and 3, so that in the event of an axial connecting rod stress by the combustion pressure of the internal combustion engine or by mass forces, almost no torque can act on the eccentric 4 and therefore the positioning drive 20, which is formed by the toothed rack 12 and the gearwheel 13 meshing with the toothed rack 12, is hardly subjected to an external stress. This applies both to the eccentric position shown, which corresponds to a higher compression ratio, and also to the eccentric position which corresponds to a lower compression ratio as a result of the connecting rod length, which is shortened by the doubled eccentricity of the pin bearing 5 in relation to the eccentric 4. Therefore, simple design conditions result for the positioning drive 20, wherein the required rotational adjustment of the eccentric 4 by 180° in each case can be ensured in a simple manner by the circumstance that the gearwheel 9, which meshes with the gear ring 8 of the eccentric 4, is driven via a positioning drive 20 by a hydraulic positioning cylinder 16.

Of course, the invention is not restricted to the exemplary embodiment shown. Thus, the two operating positions of the eccentric 4 could also be defined by a top dead center position of the eccentric 4. In the vicinity of the dead center positions, the torque stresses of the eccentric 4 remain restricted, so that the advantages linked to the dead center positions of the eccentric 4 can be utilized. In addition, the positioning movement of the positioning cylinder 16 in no way has to be converted via a toothed rack into a rotational movement required for the drive of the gearwheel 9.

The invention claimed is:

1. A connecting rod for an internal combustion engine comprising a shaft and two connecting rod eyes, of which the connecting rod eye accommodating a piston pin has an eccentric forming a pin bearing, and comprising a positioning drive, which is drivable via a hydraulic positioning cylinder, for a gear ring of the eccentric, wherein the eccentric is mounted so it is rotationally-adjustable between two stop-limited operating positions, which are offset by at least approximately 180° from one another, and wherein the axis of the pin bearing is located at least approximately in a shared axial plane of the two connecting rod eyes, and the positioning drive is accommodated in the shaft and comprises a gearwheel meshing with the gear ring of the eccentric.

2. The connecting rod according to claim 1, wherein the eccentric assumes a stop-limited top dead center position in the two operating positions.

3. The connecting rod according to claim 1, wherein the positioning drive has a toothed rack, which is connected to a piston of the positioning cylinder and meshes with a gearwheel.

4. The connecting rod according to claim 1, wherein the hydraulic positioning cylinder has a piston to which pressure can be applied on both sides.

5. The connecting rod according to claim 4, wherein the piston can be acted upon via a switchover valve, and wherein the switchover valve can be supplied with hydraulic pressure fluid via a circumferential groove of the connecting rod eye for the crank pin.

* * * * *